US007357910B2

(12) United States Patent
Phillips et al.

(10) Patent No.: US 7,357,910 B2
(45) Date of Patent: Apr. 15, 2008

(54) METHOD FOR PRODUCING METAL OXIDE NANOPARTICLES

(75) Inventors: Jonathan Phillips, Santa Fe, NM (US); Daniel Mendoza, Santa Fe, NM (US); Chun-Ku Chen, Albuquerque, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 1004 days.

(21) Appl. No.: 10/195,757

(22) Filed: Jul. 15, 2002

(65) Prior Publication Data

US 2004/0009118 A1 Jan. 15, 2004

(51) Int. Cl.
*C01F 49/02* (2006.01)
*C01F 17/00* (2006.01)
*C01B 13/14* (2006.01)

(52) U.S. Cl. .................. 423/592.1; 423/625; 423/263; 423/593.1; 423/620; 423/594.1; 423/594.3; 423/594.5; 423/595; 423/598; 423/599; 423/600; 423/594.7; 423/594.8; 423/594.9; 423/594.12; 423/594.13; 423/594.14; 423/594.15; 423/594.16; 423/604; 423/605; 423/606; 423/607; 423/608; 423/617; 423/618; 423/623; 423/624; 423/632; 423/636; 423/641; 423/594.17; 423/594.18; 423/594.19; 423/508; 423/509; 423/326; 423/331; 423/332; 423/335; 423/260; 423/249; 423/250; 423/251; 423/252; 423/253; 423/261; 977/811

(58) Field of Classification Search ................ 423/625, 423/641, 508, 509, 326, 331, 332, 335, 260, 423/249–253, 261, 263, 592.1–596, 598–600, 423/604–610, 617, 618, 620, 623, 624, 632, 423/635, 636; 977/DIG. 1, 811
See application file for complete search history.

(56) References Cited

U.S. PATENT DOCUMENTS

| 5,514,350 | A | 5/1996 | Kear et al. .................. 422/198 |
| 5,876,683 | A | 3/1999 | Glumac et al. ............. 423/325 |
| 5,989,648 | A | 11/1999 | Phillips ...................... 427/456 |
| 6,254,940 | B1 | 7/2001 | Pratsinis et al. ............ 427/562 |
| 6,261,484 | B1 | 7/2001 | Phillips et al. ................. 264/5 |
| 6,569,397 | B1 * | 5/2003 | Yadav et al. ................ 423/345 |

OTHER PUBLICATIONS

ChinHao Chou and Jonathan Phillips, "Plasma Production of Metallic Nanoparticles," J. Mater. Res., vol. 7, No. 8, pp. 2107-2113, Aug. 1992.
Dieter Vollath and Kurt E. Sickafus, "Synthesis of Nanosized Ceramic Oxide Powders by Microwave Plasma Reactions," NanoStructured Materials, vol. 1, pp. 427-437, 1992.
G. Skandan, Y-J. Chen, N. Glumac, and B. H. Kear, "Synthesis of Oxide Nanoparticles in Low Pressure Flames," NanoStructured Materials, vol. II, No. 2, pp. 149-158, 1999.
H. Shim and J. Phillips, "Restructuring of Alumina Particles Using a Plasma Torch," J. Mater. Res., vol. 14, No. 3, pp. 849-854, Mar. 1999.
Josep Costa, "Nanoparticles From Low-Pressure, Low-Temperature Plasmas," Handbook of Nanostructured Materials and Nanotechnology, vol. 1, Chapter 2, pp. 57-158, 2000.
Chun-Ku Chen, Seth Gleiman, and Jonathan Phillips, "Low-Power Plasma Torch Method for the Production of Crystalline Spherical Ceramic Particles," J. Mater. Res., vol. 16, No. 5, pp. 1256-1265, May 2001.
Chun-Ku Chen and Jonathan Phillips, "Impact of Aerosol Particles on the Structure of an Atmospheric Pressure Microwave Plasma Afterglow," J. Phys.D: Phys. vol. 35, pp. 998-1009, 2002.

\* cited by examiner

*Primary Examiner*—Steven Bos
(74) *Attorney, Agent, or Firm*—Samuel L. Borkowsky

(57) ABSTRACT

Method for producing metal oxide nanoparticles. The method includes generating an aerosol of solid metallic microparticles, generating plasma with a plasma hot zone at a temperature sufficiently high to vaporize the microparticles into metal vapor, and directing the aerosol into the hot zone of the plasma. The microparticles vaporize in the hot zone into metal vapor. The metal vapor is directed away from the hot zone and into the cooler plasma afterglow where it oxidizes, cools and condenses to form solid metal oxide nanoparticles.

18 Claims, 7 Drawing Sheets

Plasma Torch 62

To Chimney ↑

Gas + Particles Out

Plasma 74
Cooling Coil 76
Microwave Cavity 70
Wave Guide 72
Microwave Energy from Magnetron
Ceramic Tube 58
Quartz Tube 64
Cooling Coil 76
68
Plasma Gas In
66
58
Aerosol In

*Fig 2*

METHOD FOR PRODUCING METAL OXIDE NANOPARTICLES

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to metal oxide nanoparticles and, more particularly, to a plasma-based method of producing uniform, metal oxide nanoparticles from precursor metallic microparticles.

BACKGROUND OF THE INVENTION

Uniform, metal oxide nanoparticles having a diameter of about 1-100 nanometers (nm) are used in magnetic recording media, ceramics (e.g. cobalt oxide), semiconductors, gas sensors (e.g. tin oxide), catalyst supports (e.g. alumina), reinforcing agents (e.g. silica), and other important applications. The following papers and patents describe a variety of combustion-based and plasma-based methods and apparatus for generating metal oxide nanoparticles.

"Plasma Production of Metallic Nanoparticles" to C. Chou and J. Phillips, in J. Mater. Res., vol. 7, no. 8, August 1992, pp. 2107-2113, describes the production of iron or iron oxide nanoparticles from ferrocene using a microwave plasma torch apparatus. Oxygen, hydrogen, and argon were used to create the plasma and to transport the ferrocene to the coupler region (i.e. to the plasma) or to the afterglow region upstream of the plasma. In either case, when an microwave-generated oxygen plasma was used, iron oxide nanoparticles were produced.

"Synthesis of Nanosized Ceramic Oxide Powders by Microwave Plasma Reactions" to D. Vollath and K. E. Sickafus, in Nanostructured Materials, vol. 1, pp. 427-437, 1992, describes the production of alumina (i.e. aluminum oxide, $Al_2O_3$) titania (i.e. titanium oxide, $TiO_2$), and zirconia (i.e. zirconium oxide, $ZrO_2$) from the corresponding metal chloride compounds using a microwave-generated plasma.

U.S. Pat. No. 5,514,350 to B. H. Kear et al. entitled "Apparatus for Making Nanostructured Ceramic Powders and Whiskers," which issued May 7, 1996, describes an apparatus used to prepare non-agglomerated nanostructured ceramic powders from metal organic precursors.

"Synthesis of Oxide Nanoparticles" to G. Skandan et al. in Nanostructured Materials, vol. 11, no. 2, pp. 149-158, 1999, describes the production of nanoparticles of silica, titania, and alumina from hexamethyldisilazane, titanium ethoxide, and aluminum tri-sec butoxide respectively, by a combustion flame-chemical vapor condensation process.

U.S. Pat. No. 5,876,683 to N. Glumac et al. entitled "Combustion Flame Synthesis of Nanophase Materials," which issued May 2, 1999, describes a low-pressure combustion flame process for preparing nanophase powders from metal organic precursors using a flat flame combustor.

U.S. Pat. No. 6,254,940 to S. E. Pratsinis et al. entitled "Electrically Assisted Synthesis of Particles and Film With Precisely Controlled Characteristic," which issued Jul. 3, 2001, describes the production of nanoparticles. Boric acid, $BCl_3$ borane, $SiCl_4$, chlorosilane, silane, metal halide, partially hydrated metal halide, metal hydride, metal alcoholate, metal alkyl, metal amide, metal azide, metal boronate, metal carbonyl, and combinations of these materials are heated in a flame reactor and passed between plate electrodes to form the nanoparticles.

Preferred methods are cost effective, employ relatively inexpensive precursor materials, generate minimal waste, and are continuous i.e. are not halted to replenish the supply of precursor as it is converted to product. Cost-effective, continuous methods for producing uniform, high purity, metal oxide nanoparticles remain desirable.

Therefore, an object of the present invention is to provide a continuous method for producing metal oxide nanoparticles.

Another object of the present invention is to provide a method for producing metal oxide nanoparticles from inexpensive precursor materials.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a method for producing metal oxide nanoparticles. The method includes generating an aerosol having solid metal microparticles and generating a plasma with a plasma hot zone at a temperature sufficiently high to vaporize the microparticles into metal vapor. The aerosol is directed into the plasma hot zone so that the microparticles vaporize. The resulting metal vapor is directed away from the hot zone to a cooler region where it cools, condenses, and oxidizes to form metal oxide nanoparticles

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings:

FIG. 2 shows a schematic, cross-sectional representation of a microwave plasma torch;

DETAILED DESCRIPTION OF THE INVENTION

Figure 1:
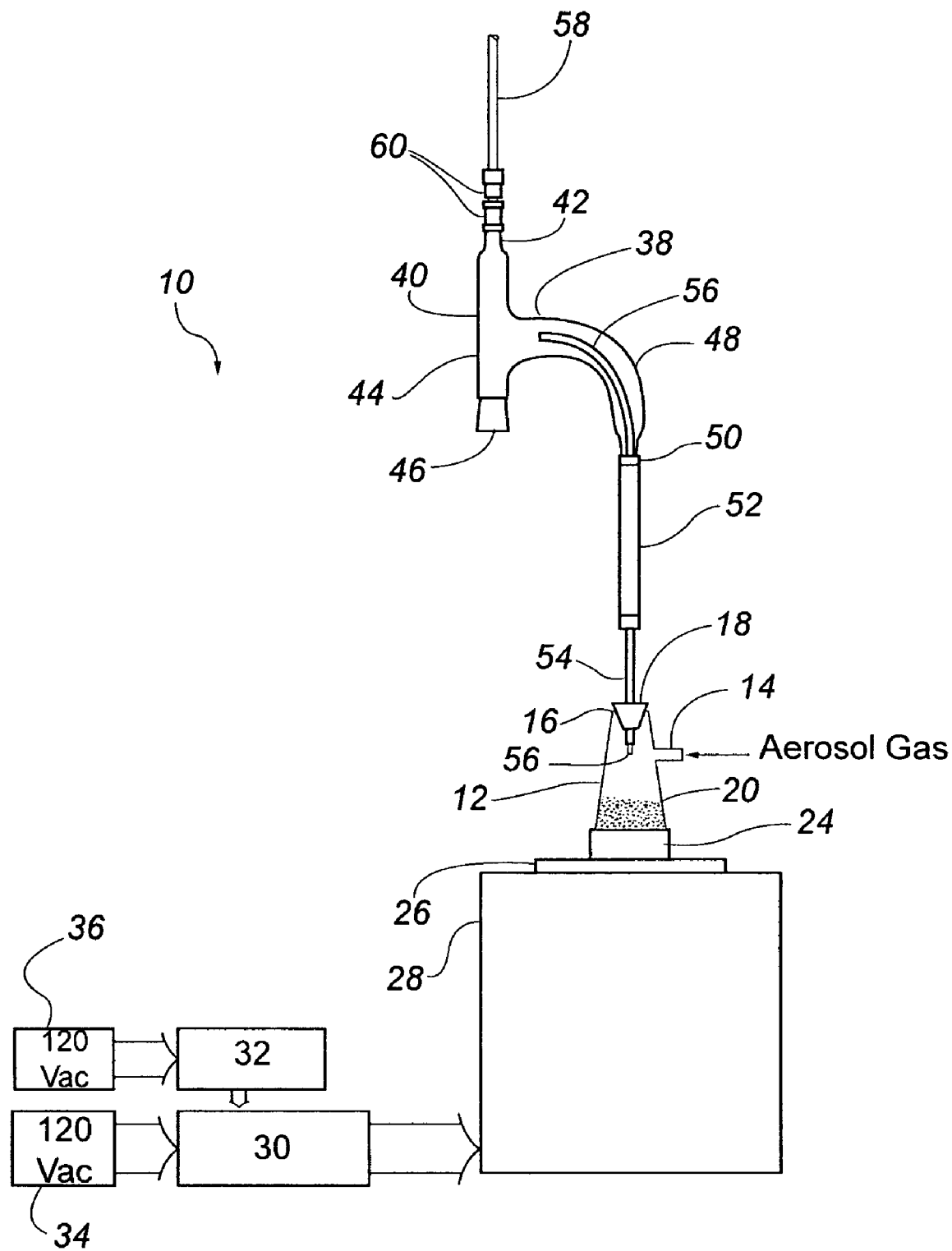
FIG. 1 shows a schematic representation of a particle feeder that produces a metal microparticle aerosol and delivers it to a plasma torch.

The invention includes a continuous method for producing metal oxide nanoparticles having a diameter of about 1-100 nanometers (nm) from metal microparticles having a diameter of about 1-1000 microns. The method involves generating an aerosol of the precursor metal microparticles, generating a plasma, and directing the precursor metal microparticles through the plasma. As the microparticles flow through the plasma "hot zone", i.e. the hottest portion of the plasma, the microparticles vaporize into metal vapor. As the metal vapor exits the hot zone and enters the cooler "afterglow region" (i.e. the region downstream of the coupler), the vapor cools rapidly and oxidizes. Nucleation and growth processes such as Ostwald ripening occur as the vapor cools and oxidizes that lead to the formation of metal oxide nanoparticles.

The method of the invention was demonstrated by converting precursor aluminum microparticles into solid, spherical, alumina nanoparticles. The aluminum microparticles were wet-ball milled, oxide-coated, aluminum microparticles having a diameter of about 1-100 microns in diameter with an average diameter of about 50 micrometers.

A plasma torch apparatus was used to generate a low power, atmospheric pressure, argon/dry air microwave plasma. An aerosol of the precursor ball-milled aluminum microparticles was directed through the microwave-generated plasma. The aluminum microparticles vaporized as they flowed through the plasma hot zone. As the resulting aluminum vapor exited the hot zone and entered the cooler afterglow of the plasma, the aluminum vapor cooled, condensed, and oxidized to form solid, spherical nanoparticles of alumina.

The plasma torch apparatus has been described previously (see, for example: H. Shim et al., "Restructuring of Alumina particles Using a Plasma Torch", *J. Mat. Res.*, volume 14, pp. 849-854 (1999); C-K Chen et al. J. Mat. Res., vol. 16, p. 1256, (2001); U.S. Pat. No. 5,989,648 to J. Phillips entitled "Plasma Generation of Supported Metal Catalysts," issued on Nov. 23, 1999; and U.S. patent application Ser. No. 10/017,289 to Phillips et al., all incorporated by reference herein). Briefly, the plasma torch includes an MKS\Astex magnetron (Woburn, Mass.) that generates 2.54 GHz microwaves. The microwaves are transmitted to the plasma region using a standard WR-289 waveguide in the TE10 mode. A three-stub tuner transfers nearly 100% of the microwave power (<1.5 kW) from the magnetron to plasma gas as it flows through a quartz, 19-mm outer diameter, plasma tube at the 'coupler' end of the waveguide.

The plasma torch generates extreme axial temperature gradients that vaporize the precursor metallic microparticles over a wide range of residence times. Microwave energy is absorbed by both the microparticles and by the plasma gas that transports the microparticles to the plasma. The absorption of energy creates a stationary plasma discharge. Its high specific power (P/V) dissipation promotes high rates of both heating and cooling. While the hot zone of the plasma is at a high temperature (about 4000 K), the cooling rate is very rapid for plasma gas and metal vapor exiting the hot zone; within about 0.2 seconds of leaving the hot zone, the plasma gas cools to nearly room temperature.

Two separately controlled sources of argon and a source of dry air were used. The major components, and approximate relative percentages, of dry air are nitrogen (about 79%), oxygen (about 19%) and argon (about 1%).

The "injector flow" carried the precursor microparticles as an aerosol to the torch. The injector flow proceeded at a rate of about 3.5 liters per minute (lpm) and was directed to approximately the center of the plasma by a 3-mm inner diameter (ID) alumina tube.

The "plasma gas flow," a mixture of 7 parts argon and one part dry air flowing at a rate of about 2.2 lpm, flowed around the outside of the central alumina tube.

The combination of the injector flow and the plasma gas flow was used to independently control the particle density, the particle feed rate, and the total residence time in the plasma. The total system gas pressure was about 640 Torr using a mechanical pump and a control butterfly valve.

Downstream of the coupler, the cooler afterglow region is surrounded by a 5-cm diameter, 20-cm tall Pyrex chimney. A conduit from the chimney leads to a filter for trapping the product metal oxide nanoparticles.

The initial particle size distribution was determined using a scanning electron microscope (SEM, Hitachi S-800) and software (S. Barrett, Image SXM). Final particle size distribution was determined using a transmission electron microscope (TEM, Philips) and the same software. Visual and analytical (x-ray diffraction (XRD) and transmission electron microscopy (TEM)) evidence indicated that the nanoparticles were substantially aluminum oxide.

Figure 3:
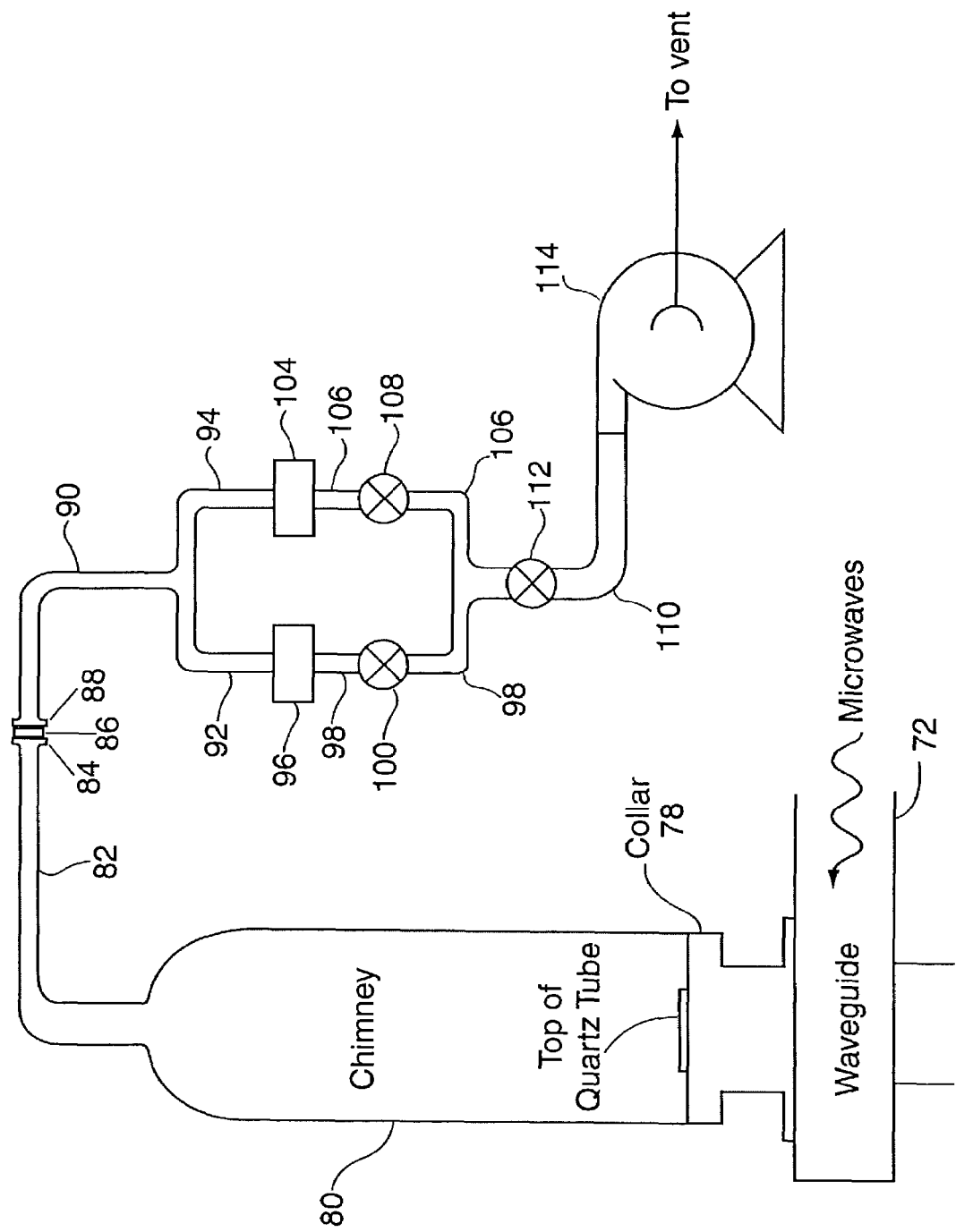
FIG. 3 shows a schematic representation of a chimney, a nanoparticle collector, and a pump.

The practice of the invention can be further understood with the accompanying figures. Similar or identical structure is identified using identical callouts. Turning now to the figures, the apparatus used to produce metal oxide nanoparticles is shown in FIGS. 1-3. FIG. 1 shows particle feeder 10. It should be understood that the main purpose of a particle feeder is to provide a metallic microparticle aerosol and to deliver the microparticle aerosol at a controlled rate to a plasma, and that any particle feeder capable of doing this may be used. Examples of particle feeders that have been adapted for plasma torches can be found in aforementioned H. Shim et al., "Restructuring of Alumina Particles Using a Plasma Torch," J. Mat. Res., vol. 14, p. 849, 1999; C-K Chen et al., J. Mat. Res., vol. 16, p. 1256, 2001; and U.S. Pat. No. 5,989,648 to J. Phillips entitled "Plasma Generation of Supported Metal Catalysts," which issued Nov. 23, 1999. An inexpensive particle feeder was constructed using parts commonly found in a laboratory. Particle feeder 10 includes particle reservoir 12 with aerosol gas inlet 14 and aerosol gas outlet 16. Outlet 16 is partially blocked with one-hole stopper 18. Reservoir 12 contains aluminum microparticles 20. Reservoir 12 rests atop and is fastened to dish 24, which rests atop diaphragm 26. Diaphragm 26 is attached to diaphragm support 28. In practice, an audio speaker provided diaphragm 26 and a ported speaker box provided support 28. Diaphragm 26 can be made to oscillate vertically using audio amplifier 30, which amplifies a signal generated by signal generator 32. Amplifier 30 and signal generator 32 were powered by power sources 34 and 36 respectively.

Particle feeder 10 also includes particle trap 38 positioned above and in alignment with reservoir 12. Trap 38 has an inverted y-shape with an inline tubular portion 40 having an upper opening 42 and a lower opening 44. Removable sealing member 46 seals lower opening 44. Trap 38 also includes side tubular portion 48 attached to a side of and in fluid communication with inline tubular portion 40. Side tubular portion 48 curves downward so that the open end 50 of side tubular portion 48 is in alignment and substantially coaxial with the hole in the one hole stopper 18. Particle feeder 10 also includes a flexible tube 52 and a more rigid outer support tube 54. The upper end of tube 52 engages and seals to open end 50 of side tube portion 48. The lower end of flexible tube 52 seals to the upper end of outer support tube 54. The lower end of support tube 54 is inserted through the hole in one-hole stopper 18 and is in compressive engagement with the stopper. Particle feeder 10 also includes a flexible inner flow tube 56. Flow tube 56 is supported by support tube 54 and extends within particle feeder 10 from reservoir 12 through support tube 54 and through side tube portion 48 until almost reaching inline tube portion 40. Flow tube 56 directs aerosol out of the reservoir to inline portion 40, and also performs a particle size separator function by not permitting dispersing agents and microparticles larger than the inner diameter of the flow tube to enter the flow tube. Particle feeder 10 may also include a particle inlet (not shown) for introducing fresh microparticles as they are being removed from the reservoir and subsequently converted into nanoparticles to improve production efficiency.

Particle feeder 10 also includes a ceramic tube 58. The lower end of ceramic tube 58 is connected to the upper end 42 of inline portion 40 of particle trap 38 with connector 60. The upper end of ceramic tube 58 is directed toward the plasma generated by plasma torch 62, a schematic cross-sectional representation of which is shown in FIG. 2. It is important to note that the terminal end of ceramic tube 58 can be adjusted. Changes in the location of the terminal end of tube 58 may affect the residence time of the particles in the plasma. FIG. 2 shows ceramic tube 58 at the lowest operational position, nearly at the bottom of the coupler, which placed the particle injection point in a relatively cool region of the plasma, upstream from the hottest zone of the plasma. This arrangement allowed for a long residence time for particles in the hot zone. The system will also operate even when the upper end of ceramic tube 58 is positioned to the top of the plasma, and even in the afterglow of the plasma.

Ceramic tube 58 passes through coaxial outer quartz tube 64 and seals against the lower end 66 of quartz tube 64. A non-aerosol-containing stream of plasma gas enters lower end 66 of quartz tube 64 through inlet 68. The upper end of ceramic tube 58 extends into microwave cavity 70, where the aerosol stream and plasma gas stream converge. Microwave energy generated by a magetron (not shown) is directed through waveguide 72 into microwave cavity 70 where it interacts with the combined gas streams inside cavity 70 and transforms the gas into plasma 74. Cooling coils 76 surrounding torch 62 are provided with flowing cooling water to remove excess heat from the torch. Collar 78 connects waveguide 72 to chimney. As metal vapor exits the plasma hot zone and passes through collar 78 and chimney 80, it oxidizes, cools, and condenses to form metal oxide particles that travel through chimney 80 and though attached conduit 82. Conduit 82 is provided with flange 84, which is engaged to flange 88 of conduit 90 with o-ring seal 86. Conduit 90 splits into first conduit portion 92 and second conduit portion 94. Metal oxide nanoparticles that enter first conduit portion 92 from conduit 90 continue onward until they reach first nanoparticle collecting member 96 where they are trapped by filter paper inside. Particles entering second conduit portion 94 from conduit 90 are trapped by filter paper inside second nanoparticle collecting member 104. Nanoparticles may be directed substantially to either collecting member 96 or collecting member 104 as desired. To direct particles to collecting member 96, with mechanical vacuum pump 114 operating, valve 100 is opened and valve 108 is closed. Pump 114 provides controllable suction using butterfly valve 112. A negative pressure is created in conduit 110 and extends to first nanoparticle collecting member 96 through conduit portion 98. Alternatively, to direct particles to second particle collecting member 104, valve 100 is closed and valve 108 is opened, which creates a negative pressure extending to second nanoparticle collecting member 96 through conduit portion 106. Gas is vented away from pump 114.

The following descriptive example illustrates the production of alumina nanoparticles using the method of the invention.

EXAMPLE

Figure 4:
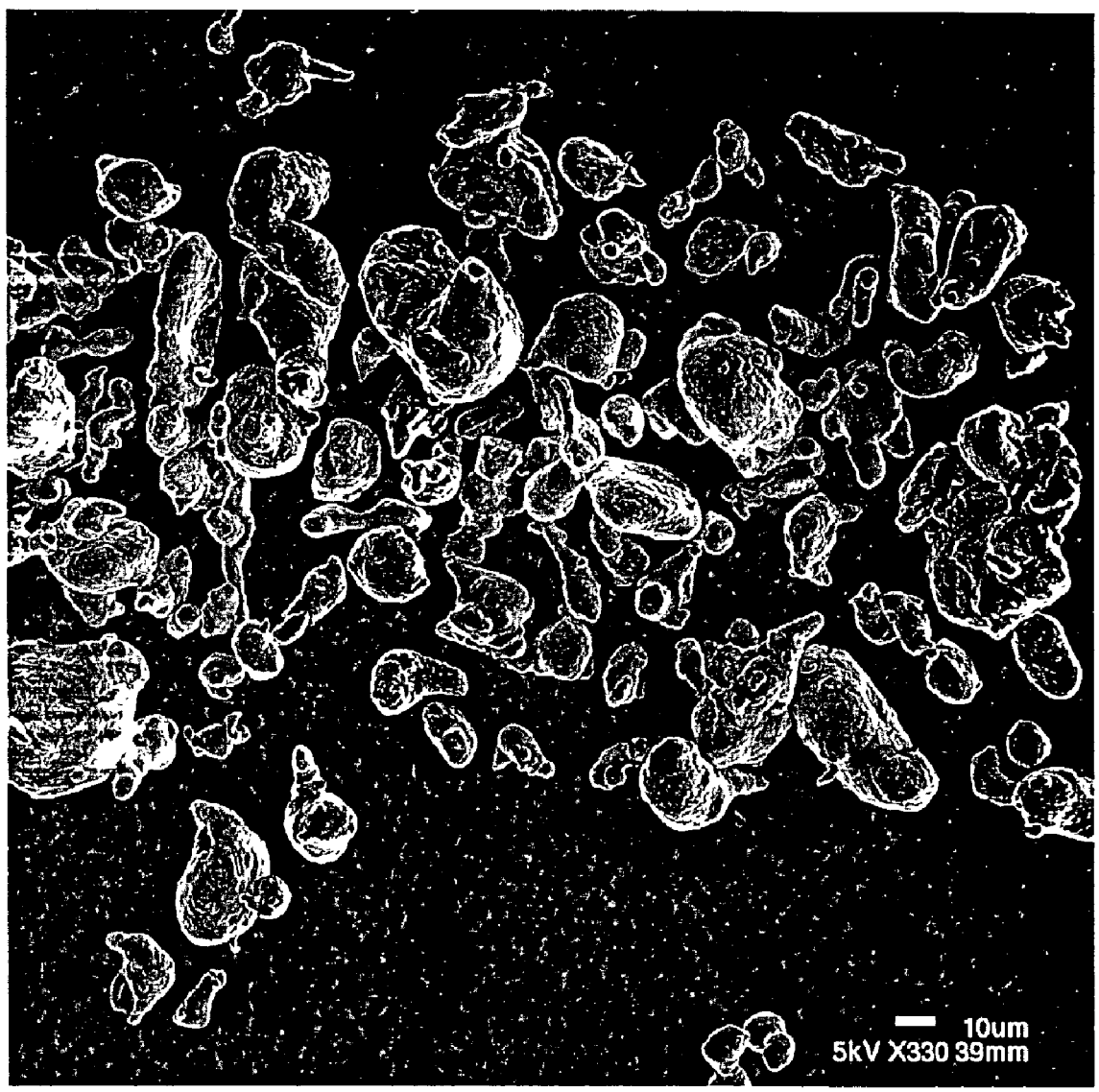
FIG. 4 shows a scanning electron micrograph (SEM) of ball-milled aluminum precursor particles used to demonstrate the method of the invention.

This example relates to the production of alumina nanoparticles. First, a flow of dry argon/dry air plasma gas at a flow rate of 2.2 liters/minute is directed to the plasma torch shown in FIG. 2. The ratio of oxygen to inert gas (inert gas includes argon and the nitrogen from the dry air) is about 1 part oxygen to about 108 parts argon. The plasma gas is ignited by 500 Watts of microwave power to form an oxidizing, atmospheric, microwave-generated plasma. Cooling water at about 5-10° C. was circulated throughout the plasma torch system so that the system could be operated continuously without overheating. Next, reservoir 12, shown in FIG. 1, is made to oscillate vertically, which disperses precursor ball-milled aluminum microparticles inside reservoir 12. FIG. 4 shows a SEM of the precursor ball-milled microparticles, which indicates precursor particle sizes generally within the range of about 10-80 microns.

Next, aerosol gas is directed into particle reservoir 12 through inlet 14 and combines with the aluminum microparticles inside to produce a aluminum microparticle aerosol that flows out of reservoir 12 through flow tube 56 at a rate of 3.5 liters/minute. Aluminum microparticles exit flow tube 56 and enter inline portion 40 of particle trap 38. Some of the heavier particles fall toward stopper 46 where they are later removed, but most are carried by the aerosol gas upward through ceramic tube 58 to plasma torch 62 and through the hot zone of the plasma where they vaporize into aluminum vapor. The vapor is believed to contain aluminum atoms and clusters of aluminum atoms. After exiting the hot zone, the vapor is directed to the cooler afterglow region (see FIG. 3) as it passes through collar 78 and into chimney 80 where it cools, condenses, and oxidizes. With mechanical vacuum pump operating and valve 108 closed, alumina nanoparticles continue through conduit 82, conduit 90 and into particle collecting member 96 where they are trapped by filter paper inside. Gas continues flowing onward, through conduit 110, through valve 112, and through mechanical pump 114 from which it vents to the outside. The rate of alumina nanparticle production for this example was about 400 milligrams/hour.

Figure 5:
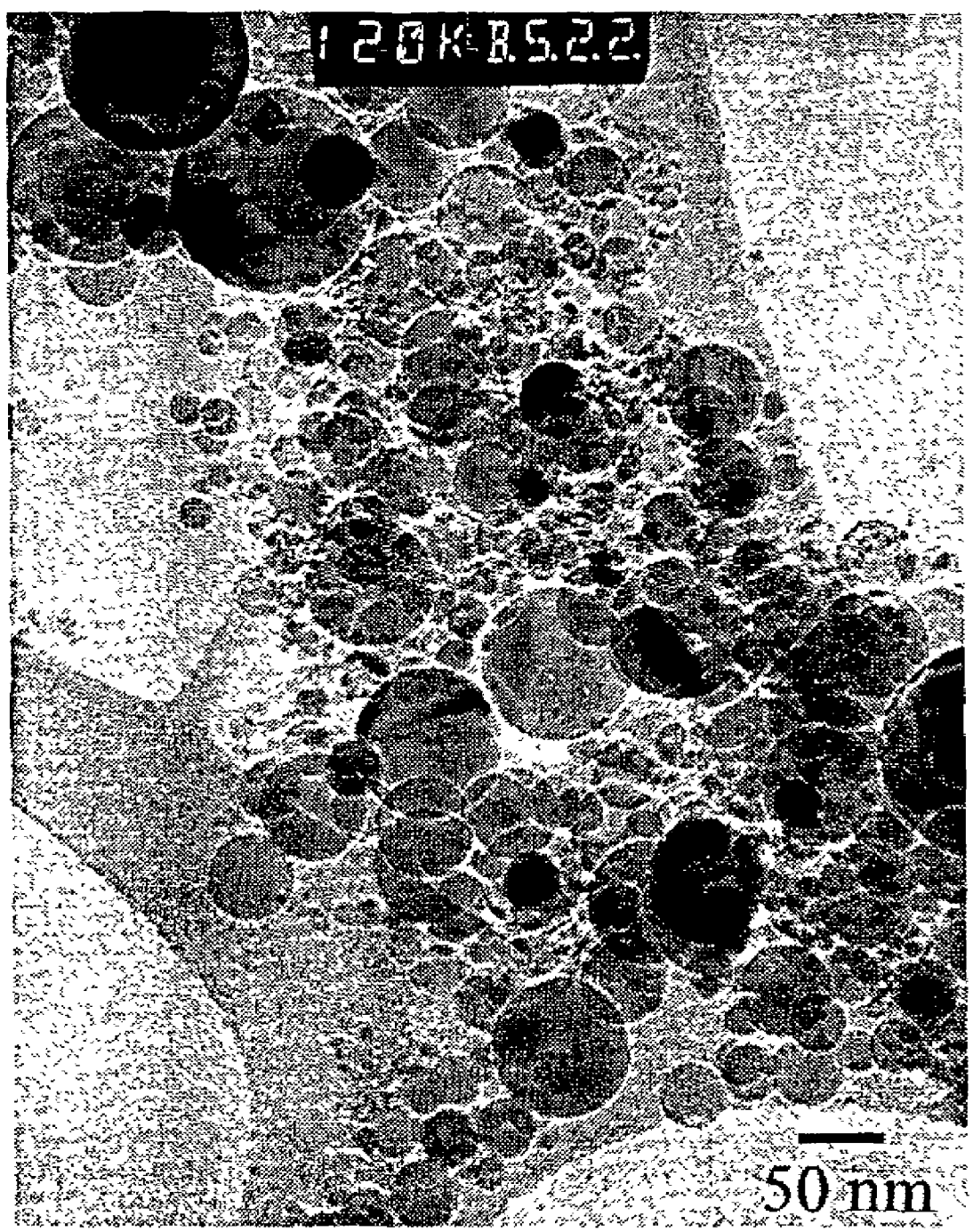
FIG. 5 shows a transmission electron micrograph (TEM) of aluminum oxide nanoparticles produced from the precursor particles of FIG. 4 using the method of the invention.

A micrograph of the aluminum oxide nanoparticles is shown in FIG. 5. As FIG. 5 shows, all of the nanoparticles have a diameter less than 1 micron, most have a diameter less than 100 nm. In addition, all are spherical or nearly so.

Figure 6:
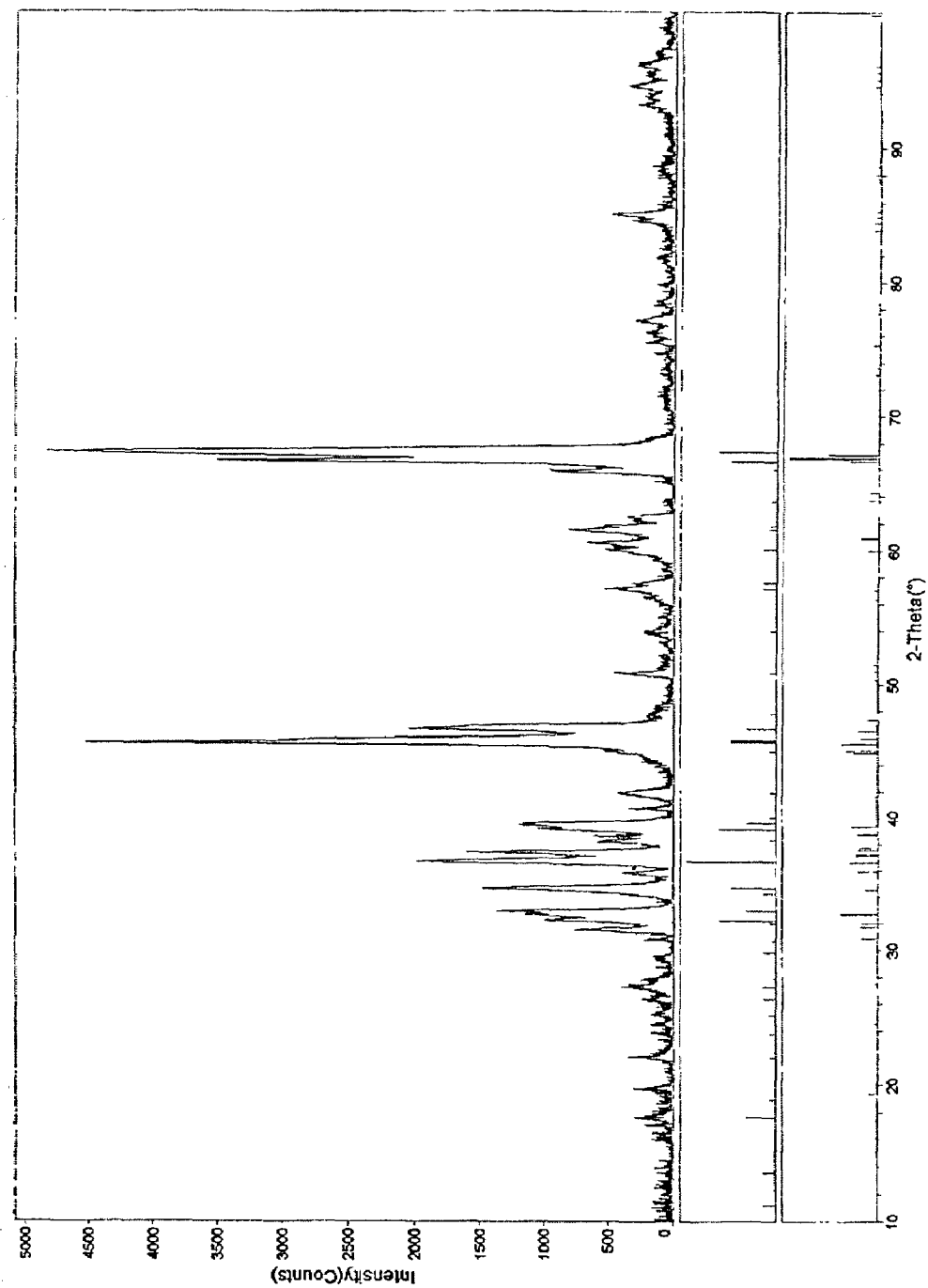
FIG. 6 shows an XRD (x-ray diffraction) spectrum of alumina produced according to the invention, along with XRD line positions and intensities for δ phase alumina and for δ' phase alumina.

Nanoparticle composition was determined using x-ray diffraction (XRD) spectroscopy. FIG. 6, top portion, shows an x-ray diffraction (XRD) spectrum of the alumina nanoparticles. FIG. 6, middle portion, shows the XRD line positions and relative intensities for the δ phase of aluminum oxide, and the bottom portion of FIG. 6 shows an XRD line positions and relative intensities for the δ' phase of aluminum oxide. The spectra are plotted as intensity versus 2-theta angle. After comparing the top spectrum with the known line positions/line intensities for the δ and δ' phases of alumina, it is clear that the nanoparticles are composed of both δ and δ' phases of alumina.

Figure 7:
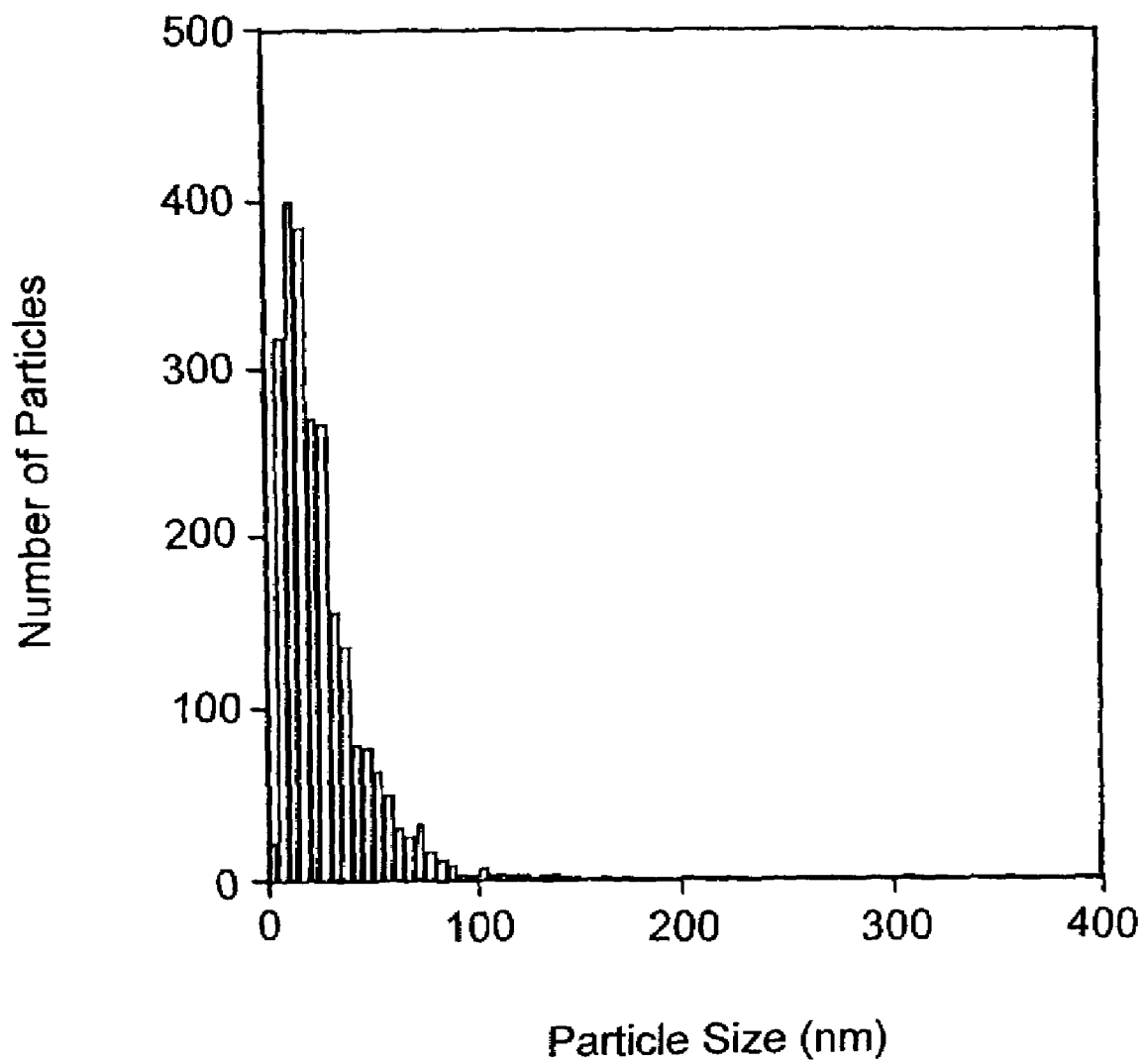
FIG. 7 shows a histogram of a particle size distribution for a batch of alumina nanoparticles produced using the method of the invention.

A histogram of particle size vs. number of particles for the product alumina nanoparticles is shown in FIG. 7. As FIG. 7 shows, most of the nanoparticles are less than 100 nm in diameter.

While the above example illustrates the production of alumina nanoparticles, it should be understood that because the hot zone temperature of at least 3500° C. exceeds the vaporization temperature for all metals, metal oxide nanoparticles of any solid metal can be produced using the method of the invention. Thus, metal oxide nanoparticles of the following metals can be produced: alkali metals Li, Na, K, Rb, Cs, Fr; the alkaline earth metals Be, Mg, Ca, Sr, Ba, and Ra; transition metals Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, and Au; lanthanide series metals La, Ce, Pr, Nd, Pm, Eu, Gd, Tb, Dy, Ho, Er, Tm, Yb, Lu; actinide series metals Ac, Th, Pa, U, Np, Pu, Am, Cm; and post-transition metals Al, Ga, In, Si, Ge, Pb, Sb, Te, and Bi.

The conversion of highly irregularly shaped precursor metallic particles into smaller, uniform particles indicates that the method likely involves vaporization of the precursor metallic microparticles followed by nucleation and growth to form metal oxide nanoparticles. While not intending to be bound by theory, the vaporization of the microparticles can be understood by a consideration of the thermodynamics. A metallic particle is vaporized, i.e. converted to a vapor of metal atoms and small clusters of metal atoms, when the total energy transferred to the particle exceeds the sum of the following energies: the energy required to raise the temperature of the particle to its melting temperature; the latent heat of fusion of the particle; the energy required to heat the molten particle to its vaporization temperature; and the latent heat of vaporization. These energies were supplied by convection from the hot plasma gas in the field region and by direct dissipation of microwave energy in the (conductive) particle itself.

Upon entering cooler regions, metal atoms and clusters oxidize and cool by rapidly losing energy via radiation and convection. As they cool, the atoms and clusters interact with oxygen and each other to form metal oxide nanoparticles. The size and shape of the particles formed this way vary according to the type of the metal, the density of the metal gas, and the rate of cooling. Metal oxide agglomerates act as metal oxide nuclei that grows to a stable size; growth is a function of metal atom density present in the portion of the cooling zone having a temperature below the vaporization temperature ($T_{vap}$) but above the freezing temperature ($T_s$) of the metal oxide.

Growth is also a function of any electrical charge that the nanoparticles have. In contrast to methods that use flames, plasma methods such as the method of the invention provide many sources that can transfer charge to the particles. Subsequent growth is a function of temperature profile downstream from this point. Significant agglomeration and other forms of growth occur only at a temperature between $T_{vap}$ and $T_s$. Decreasing the residence time in the plasma region will reduce the average particle size. In the previous Example, these effects account for the small product particle size. Also, the higher the density of metal atoms, the more collisions between metal atoms and thus the more rapid the growth of particles.

The product nanoparticle sizes varied slightly according to the applied microwave power. About 50-30,000 Watts of microwave power can be used. Preferably, about 300-1200 Watts of applied microwave power is used. Most preferably, about 500-850 Watts is used.

It should be understood that while the description throughout refers to the use of microwave-generated argon plasma, it is expected that other plasma systems can also be used. High pressure, i.e. greater than about 100 torr, plasma systems generated using other plasma generating means such as radiofrequency radiation and DC, for example, should be capable of producing plasmas that can be used with the method of the invention.

Inert gases such as He, Ne, Ar, $N_2$, and Xe, to name a few, may be combined with dry air or oxygen to provide the plasma.

Microwave energy sustains a high-pressure plasma discharge by accelerating free electrons that transfer kinetic energy to gas molecules. This heats the gas molecules and promotes ionization, which produces more free electrons. The plasma torch generates two plasma regions due to the convective gas flow. The 'field region' is the region surrounded by the coupler (about 5 cm high) where the microwave electric field heats the free electrons. The field also heats conduction electrons in any entrained metal particles such that energy dissipates volumetrically by resistive heating. After the gas leaves the coupler zone, it enters the 'afterglow' region. Little or no electromagnetic field energy transfer to the plasma gas or entrained particles takes place in this region. Thus, the gas/particle mixture cools with extreme rapidity. After a few centimeters of travel, the elections and ions recombine and the plasma no longer exists.

It is believed that several important properties of plasmas make them ideal for the formation of metal oxide nanoparticles from larger metallic particles. Firstly, an extremely high temperature can exist in the field region of high-pressure plasmas. As the particles traverse the field region, the conduction electrons present in the metallic particles can absorb energy directly from the plasma and the temperature is high enough to fully ablate/vaporize metals with the highest of melting temperatures. The rotation/translation temperature of the gas at the entry to the afterglow (about 2 centimeters beyond the exit from the coupler) has been determined, using light emission spectroscopy, to exceed 3300 K (see: Chun-Ku Chen et al., "Impact of Aerosol Particles on the Structure of an Atmospheric Pressure Microwave Plasma Afterglow," J. Physics D: Appl. Phys. Vol. 35, pp. 998-1009, (2002)). This temperature is higher than the melting temperature for most metals. Thus, it is likely that the gas temperature in the coupler is even higher than 3300 K, and that an even higher temperature may be attained for a greater level of absorbed power. The high temperature creates a driving force for convective energy transfer for rapid particle heating. Secondly, large axial temperature gradients assure that gas and entrained microparticles vaporize rapidly in a short residence time, and cooling condensation occurs extremely fast in the afterglow so that particles do not have sufficient time to grow and become larger than nanoparticles. Thirdly, direct absorption represents an independent energy transfer mechanism that can dramatically increase the energy efficiency of the invention.

The microwave power, the total gas pressure, and flow rate should affect the heating rate of the precursor material and the cooling rate of the molten particles. These parameters can be manipulated and should be adjustable to provide metal oxide nanoparticles of a desired range of sizes.

The foregoing description of the invention has been presented for purposes of illustration and description and is not intended to be exhaustive or to limit the invention to the precise form disclosed, and obviously many modifications and variations are possible in light of the above teaching.

Commercially available particle feeders, for example, could be used instead of the particle feeder described herein.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for producing metal oxide nanoparticles, comprising the steps of:
    (a) generating an aerosol comprising solid metallic precursor microparticles;
    (b) generating a microwave plasma comprising oxygen and a plasma hot zone at a temperature sufficiently high to vaporize the microparticles;
    (c) directing the aerosol into the hot zone of the microwave-generated plasma and allowing the microparticles to vaporize to vapor; and
    (d) directing the vapor away from the plasma hot zone and into a cooler region where the vapor cools, condenses, and oxidizes to form metal oxide nanoparticles.

2. The method of claim 1, wherein the precursor particles comprise microparticles of elemental metals and alloys, said elemental metals and alloys being selected from the group consisting of Li, Na, K, Rb, Cs, Fr, Be, Mg, Ca, Sr, Ba, Ra, Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, La, Ce, Pr, Nd, Pm, Eu, Gd, Tb, Dy, Ho, Er, Tm, Yb, Lu, Al, Ga, In, Si, Ge, Pb, Sb, Te, Bi, Ac, Th, Pa, U, Np, Pu, Am, Cm, and alloys thereof.

3. The method of claim 2, wherein the precursor particles comprise elemental iron, lithium, sodium, potassium, cobalt, nickel, aluminum, titanium, silicon, or mixtures thereof.

4. The method of claim 2, wherein the precursor particles comprise aluminum.

5. The method of claim 1, wherein the solid metallic precursor microparticles are between about 1-1000 microns in diameter.

6. The method of claim 1, wherein the solid metallic precursor microparticles are about 1-100 microns in diameter.

7. The method of claim 1, wherein the metal oxide nanoparticles comprise oxides of the metals Li, Na, K, Rb, Cs, Fr, Be, Mg, Ca, Sr, Ba, Ra, Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, La, Ce, Pr, Nd, Pm, Eu, Gd, Tb, Dy, Ho, Er, Tm, Yb, Lu, Al, Ga, In, Si, Ge, Pb, Sb, Te, Bi, Ac, Th, Pa, U, Np, Pu, Am, Cm, or mixed metal oxides of these metals.

8. The method of claim 1, wherein the metal oxide nanoparticles comprise oxides of the metals iron, lithium, sodium, potassium, cobalt, nickel, aluminum, titanium, silicon, or mixed metal oxides of these metals.

9. The method of claim 1, wherein the metal oxide nanoparticles comprise aluminum oxide.

10. The method of claim 1, wherein the plasma comprises oxygen in combination with argon plasma, helium plasma, xenon plasma, nitrogen plasma, oxygen plasma, halogen plasma, or mixtures thereof.

11. The method of claim 1, where the plasma is generated from plasma gas at a gas pressure of about 0.001-100 atmospheres.

12. The method of claim 1, wherein the plasma is generated from plasma gas at a pressure of about 1 atmosphere.

13. The method of claim 1, wherein the plasma is generated using about 50-30,000 watts of microwave power.

14. The method of claim 1, wherein the plasma is generated using about 300-1200 watts of microwave power.

15. The method of claim 1, wherein the plasma is generated using about 500-850 watts of microwave power.

16. The method of claim 1, wherein the metallic microparticles have a diameter of about 1-1000 microns.

17. The method of claim 1, wherein the product metal oxide nanoparticles comprise metal oxide nanoparticles having a diameter of about 1-100 nanometers.

18. The method of claim 1, wherein the metal oxide nanoparticles comprise spherical metal oxide nanoparticles.

* * * * *